United States Patent [19]
Wang

[11] Patent Number: 5,922,379
[45] Date of Patent: Jul. 13, 1999

[54] BIODEGRADABLE PROTEIN/STARCH-BASED THERMOPLASTIC COMPOSITION

[75] Inventor: Shu Huan Wang, Plano, Tex.

[73] Assignee: Natural Polymer International Corporation, Richardson, Tex.

[21] Appl. No.: 09/072,857

[22] Filed: May 5, 1998

[51] Int. Cl.$^6$ .......................... A21D 13/00; A21D 13/04; A21D 13/06

[52] U.S. Cl. .......................... 426/138; 426/549; 426/551; 426/553; 426/561; 426/564; 426/568; 426/574; 426/575; 426/576; 426/577; 426/578; 426/580; 106/287.35; 106/162.5; 106/162.51; 106/164.01; 521/84.1; 521/109.1

[58] Field of Search ...................................... 426/138, 549, 426/551, 553, 561, 564, 568, 574, 575, 576, 577, 578, 580; 106/287.35, 162.5, 162.51, 164.01, 206.1; 521/84.1, 109.1

[56] References Cited

U.S. PATENT DOCUMENTS

| | | | |
|---|---|---|---|
| 4,076,846 | 2/1978 | Nakatsuka et al. | 426/62 |
| 4,465,702 | 8/1984 | Eastman et al. | 426/578 |
| 4,592,795 | 6/1986 | Bridgeford | 156/203 |
| 4,863,655 | 9/1989 | Lacourse et al. | 264/53 |
| 5,057,157 | 10/1991 | Jane et al. | 127/70 |
| 5,160,368 | 11/1992 | Begovich | 106/154.1 |
| 5,320,669 | 6/1994 | Lim et al. | 106/157 |
| 5,321,064 | 6/1994 | Vaidya et al. | 524/56 |
| 5,354,621 | 10/1994 | Liebermann | 428/532 |
| 5,397,834 | 3/1995 | Jane et al. | 525/54.1 |
| 5,446,078 | 8/1995 | Vaidya et al. | 524/17 |
| 5,523,293 | 6/1996 | Jane et al. | 514/21 |
| 5,545,450 | 8/1996 | Andersen et al. | 428/34.5 |
| 5,549,859 | 8/1996 | Andersen et al. | 264/102 |
| 5,580,624 | 12/1996 | Andersen et al. | 428/34.5 |
| 5,618,341 | 4/1997 | Andersen et al. | 106/287.35 |
| 5,660,900 | 8/1997 | Andersen et al. | 428/35.6 |
| 5,665,152 | 9/1997 | Bassi et al. | 106/145.1 |
| 5,736,586 | 4/1998 | Bastioli et al. | 521/84.1 |

OTHER PUBLICATIONS

Brother, et al., "Protein Plastics from Soybean Products," *Industrial and Engineering Chemistry*, pp. 1648–1651 (Dec. 1940).

Huang et al., "Protein Structures and Protein Fibers—A Review," *Polymer Engineering and Science*, pp. 81–91 (Feb. 1974).

Schilling et al., Mechanical Properties of Biodegradable Soy–Protein Plastics, *J. Mater. Res.*, vol. 10, No. 9, pp. 2197–2202 (Sep. 1995).

Spence et al., "Soil and Marine Biodegradation of Protein—Starch Plastics," *American Chemical Society*, pp. 149–158 (Nov. 1995).

Glenn et al., "Starch–Based Microcellular Foams," *Cereal Chemistry*, vol. 72, No. 2, pp. 155–161 (1995).

Schut, "Bold New High–Tech Biodegradables," *Plastics World*, pp. 29–33 (Dec. 1996).

Bhatnagar et al., "Starch–Based Plastic Foams From Various Starch Sources," *Cereal Chemistry*, vol. 73, No. 5 pp. 601–604 (1996).

Wang et al. "Effects of Polyhydric Alcohols on the Mechanical Properties of Soy Protein Plastics," *J.M.S.—Pure Appl. Chem*, pp. 557–569 (1996).

*Primary Examiner*—Nathan M. Nutter
*Attorney, Agent, or Firm*—Madson & Metcalf

[57] ABSTRACT

The invention provides a biodegradable protein/starch-based thermoplastic composition. The composition is particularly useful in preparing low ratio expanded foams. Natural cellulosic fibers such as grass fiber, wood fiber, chopped straw, bagasse, etc. function as reinforcement filler. A metallic salt hydrate is added to improve mechanical properties of the protein/starch-based thermoplastic. The composition is processed by conventional methods, such as extrusion and injection molding, into packaging material or articles that are low density, high compressive strength, tensile strength, and good resilience.

57 Claims, No Drawings

BIODEGRADABLE PROTEIN/STARCH-BASED THERMOPLASTIC COMPOSITION

BACKGROUND OF THE INVENTION

1. Field of the Invention

The present invention relates to a biodegradable protein and starch based thermoplastic composition with natural cellulosic fiber. The invention can be prepared as a biodegradable low ratio expanded foam useful as a low density foam packaging material or food container.

2. Technology Background

There is a continuing need in the food packaging art to provide materials and articles that are disposable, completely biodegradable, possess good mechanical properties at a low price, and environmentally friendly.

In recent years, people have become more aware of environmental pollution caused by plastics. Efforts have been made in developing biodegradable plastics, such as protein-based plastics and starch based plastics. These biodegradable thermoplastic compositions have been developed in an attempt to replace nondegradable petroleum-based thermoplastics for manufacturing packaging material. In the 1930–1940's and 1980's, protein and starch were used as a "filler" with conventional petroleum-based thermoplastics which made it possible to decrease the raw material cost or facilitate material destruction. (Satow, Sadakichi, U.S. Pat. Nos. 1,245,975 and 1,245,976 (Nov. 6, 1917); Sturken, Oswalt, U.S. Pat. No. 2,053,850 (Sept. 8, 1936); U.S. Pat. Nos. 1,245,978, 1,245,983, and 1,245,984 (Nov. 6, 1917)).

Protein-based plastics such as protein fiber, edible film or other articles have been made by extrusion, casting, or injection molding. One such example is described in U.S. Pat. No. 5,523,293, "Soy Protein-Based Thermoplastic Composition For Preparing Molded Articles," where articles were made from a composition having soy protein as the main material, starch as a carbohydrate filler, and requiring a reducing agent for the purpose of breaking protein disulfide bonds.

A typical starch-based plastic is described in U.S. Pat. No. 4,592,795, "Non-edible, Reinforced Amylose and Amylose Starch Food Casings," which discloses food casings made of a web formed from a fibrous material such as abaca fiber, wood fiber or synthetic polymer web, and curing the impregnated web in a high amylose starch with cross-linked matrix. Another example is described in U.S. Pat. No. 4,863,655, which discloses a low density biodegradable packaging material made of high amylose starch preferably modified by propylene oxide, alkylene oxide, or polyvinyl alcohol.

A continuing problem of protein and starch based plastics is water resistance and poor aging properties. These plastics tend to absorb water over time which interacts with the protein or starch weakening its mechanical properties. In other words, they degrade too quickly. Articles made from protein or starch plastics usually have good initial mechanical properties, but do not last more than a month or two.

Other recent patents disclose starch-based compositions containing inorganic fillers. U.S. Pat. No. 5,549,859, discloses a method for the extrusion of highly plastic and moldable hydraulically settable compositions. U.S. Pat. No. 5,545,450, discloses molded articles having an inorganically filed organic polymer matrix. U.S. Pat. No. 5,660,900, discloses inorganically filled, starch-based compositions for manufacturing containers and other articles having a thermodynamically controlled cellular matrix. U.S. Pat. No. 5,618,341, discloses a method for uniformly dispersing fibers within starch-based composition. U.S. Pat. No. 5,580,624 discloses food and beverage containers made from inorganic aggregates and polysaccharide, protein, or synthetic organic binders, and the methods of manufacturing such containers. In these products, starch, protein or cellulose (cellulose derivatives) were modified as a binder or thickening agent to form a fibrous slurry composition. The calcium carbonate, hollow glass spheres, or other inorganic filler was the main ingredient with small amounts of fiber. Large amounts of inorganic material in land fills are detrimental to soil ecology.

In view of the foregoing, it would be an advancement in the art to provide biodegradable thermoplastic compositions which are sufficiently water resistant and which possess good mechanical and aging properties. It would also be an advancement in the art to provide biodegradable thermoplastic compositions which can be recycled or ingested. It would be a further advancement in the art to provide biodegradable thermoplastic compositions which enhance the soil, if disposed therein.

Such biodegradable thermoplastic compositions are disclosed and claimed herein.

SUMMARY OF THE INVENTION

The present invention provides a protein/starch-based biodegradable or recyclable thermoplastic composition. Protein and starch are the main ingredients. Pure protein has poor flowability, but it can be improved by compounding with starch. Starch products are brittle with poor physical aging, but they can be improved by compounding with protein and chemical modification. The flexibility of protein/starch compositions can be enhanced by the aid of plasticizers and chemical modification, but the glass transition temperature of such protein/starch composition is decreased. The use of natural cellulosic fiber as reinforcement in protein/starch compositions reduce the overall composition cost, and also enhance toughness, thermal and strength properties.

Another advantage according to the present invention is the ability to prepare food packaging products which consist exclusively of food-grade ingredients, making them edible. The used food packaging and containers can be collected and pasteurized, ground, and pelletized for animal feed or fish feed. Because the compositions within the scope of the present invention have a high organic content, they can be added to soil to improve or fertilize the soil.

The protein/starch thermoplastic compositions with natural cellulosic fiber may be used for making packaging material and articles by extrusion or injection molding that are biodegradable and possess low density, high compressive strength, tensile strength, and good resilience. Extruded foams of compositions within the scope of the present invention display a high tensile strength of about 0.3 to 12 MPa (megapascals), the density 0.1 to 0.8 grams per cubic centimeter, and the resilience is above 80%.

The thermoplastic compositions are preferably made of about 10 to 46 wt. % protein, about 20 to 46 wt. % starch, about 5 to 25 wt. % natural cellulosic fiber, about 8 to 20 wt % water, about 5 to 25 wt. % plasticizer, about 0 to 4 wt. % physical or chemical blowing agent, about 0.5 to 2 wt. % nucleating agent, about 0.5 to 2 wt. % lubricant, about 0.5 to 5 wt. % metallic salt hydrate, and other desired additives, such as coloring agents, modifiers, cross-linking reagents, and preservatives.

The compositions are preferably mixed, extruded and pelletized. The pellets are then processed in a manner similar to conventional thermoplastics. Low ratio expanded foam sheets or articles can be prepared by single screw extrusion or injection machine. Alternatively, the ingredients can be compounded and extruded to form the final article in a single-step process. Molded articles from extrusion foam sheet can be made by a thermoforming machine.

Therefore, the present invention provides protein/starch thermoplastic compositions which are biodegradable, recyclable, light weight, strong, and water resistant.

DETAILED DESCRIPTION OF THE INVENTION

The present invention is directed to biodegradable protein/starch thermoplastic compositions. A low ratio expanded foam is made of the protein/starch thermoplastic composition with natural cellulosic fiber, plasticizer, water, blowing agent, nucleating agent, metallic salt hydrate, and cross-linking reagents, modifiers and other additives as desired.

The protein/starch thermoplastic compositions containing natural cellulosic fiber can be made by different methods. One method includes two steps: first mixing the ingredients and extruding them to form pellets, and second processing the pellets by injection or extrusion molding, including extrusion with a foam die. Twin screw or single screw extruders can be used. In another method a low ratio expanded protein/starch thermoplastic foam is prepared using a counter-rotating twin screw extruder with foam die. The twin screw extruder performs both the compounding and foaming extrusion functions. The raw materials can be pretreated or modified to affect the mechanical properties of the protein/starch thermoplastic composition. The expanded extrusion ratio is about 2.0 to 8.0, the foam density is about 0.1 to 0.8 grams per cubic centimeter. The tensile strength is about 0.3 to 12 MPa.

The protein used in the protein/starch compositions within the scope of the present invention can be either plant or animal derived protein material. Soy protein is a preferred source of plant derived protein. Suitable soy protein includes soy protein concentrate, soy protein isolate, or a combination thereof, such as those commercially available from Archer Daniels Midland Company, Decatur, Illinois; Protein Technologies International, St. Louis, Mo.; and Central Soya Company, Inc., Fort Wayne, Ind. Other plant derived protein includes gluten (such as wheat, oat, or rice gluten), corn zein, hordein, avenin, kafirin, or a combination thereof. Gluten is another preferred source of plant derived protein. The plant derived protein should comprise at least 70% to 90% protein products. Suitable animal derived protein includes casein, albumin, collagen, gelatin, keratin, or a combination thereof.

The starch used in the protein/starch compositions within the scope of the present invention can be native (unmodified) starch, chemically modified starch, pregelatinized starch, or a combination thereof. Typical native starches can include corn starch, including maize, waxy maize, and high amylose corn starch, potato starch, sweet potato starch, wheat starch, rice starch, tapioca starch, sorghum starch, and a combination thereof. The starch may be a normal starch (about 0 to 30 wt. % amylose) or a high amylose starch (greater than about 50 to 70 wt-% amylose). The amount of starch (wt. %) combined with the protein is preferably about 20 to 50 wt. %.

Typical chemically modified starches which can be used in the present invention include hydroxyethyl starch, hydroxypropyl starch, carboxymethyl starch, acetylated high amylose starch, starch acetate, starch maleate, starch octenyl-succinate, starch succinate, starch phthalate, hydroxy-propylate high amylose starch, cross-linked starch, starch phosphates, hydroxypropyl distarch phosphate, cationic starch, starch propionamide, and a combination thereof.

The starch may also be a chemically-modified starch selected from starch ether derivatives including hydroxyalkyl derivatives like hydroxybutyl starch; carboxyalkyl derivatives; ester derivatives including saturated fatty acid derivatives; half-esters of dicarboxylic acids/anhydrides including acetylated starch and acetylated high amylose starch; starch modification with alkylene oxides; cross-linked starch including starch reacted with a cross-linking agent, such as, phosphorus oxychloride, epichlorohydrin, hydrophobic cationic epoxides, or phosphate derivatives.

Chemical modification of protein and starch can be used to improve the physical and chemical properties of compositions made therefrom, such as flexibility, thermal stability, water resistance, compatibility between protein and starch, processing flowability, aging resistance, etc. For example, acid modified soy protein greatly improves the surface hydrophobicity. The foaming capacity and foam stability of soy protein are improved by succinylated and acetylated soy protein. The compatibility of soy protein with starch becomes worse with increased high amylose starch content. However, the compatibility of high amylose starch with soy protein can be improved by modification of the protein and/or starch.

Chemical modification of starch can be used for enhancing molecular stability and resistance to high temperature hydrolysis. Hydroxypropylate, phosphorylate, and acetate derivatives of starch can reduce the retrogradation rate and have good aging properties and stability. Starch phosphate and succinate derivatives have intermolecular interaction with cationic molecules. Cationic starches have better interaction with electronegative substances, such as cellulose. Hydroxypropylate high amylose starch or tapioca starch, acetate starch, and starch phosphate or cross-linked starch have good foaming properties. The items as stated above can be ingredients in protein/starch/natural cellulosic fibers plastics within the scope of the present invention.

The total amount of protein/starch (wt. %) in the thermoplastic composition is preferably about 40 to 65 wt. %.

Plasticizers improve the processing, flowability, and enhance flexibility of the protein/starch/natural cellulosic fiber compositions. An effective amount of plasticizer is about 5 to 25 wt. %, preferably about 15 to 25 wt. %. Typical plasticizers which can be used in the present compositions include polyols and high molecular weight alcohols, such as glycerol, ethylene glycol, 1,3-propanediol, propylene glycol, sorbitol, sorbitan, mannitol, diglycerol, butanediol, and urea, or mixtures thereof. Glycerol and propylene glycol are currently preferred plasticizers. The esters of polyols, such as glycerol monoacetate and glycerol diacetate may be used as an auxiliary plasticizer.

Water is used as both a plasticizer and a blowing agent in the present invention. An effective amount of water will improve the processing flowability of the composition and also enhance the physical properties of the low ratio expanded foam. The amount of water is about 8 to 20 wt. %, preferably 10 to 18 wt. %.

The metallic salt hydrate included in the compositions of present invention can be calcium, sodium, potassium, zinc, iron, aluminum or phosphorus salts or a mixture thereof. The metallic salt hydrate can also be chloride, carbonate, sulfate, nitrate, lactate, oxalate, or acetate salts or a mixture thereof. Examples of preferred metallic salt hydrates include $CaCl_2.2H_2O$, $Ca(NO_3)_2.4H_2O$, $CaSO_4.2H_2O$, $AlK(SO_4)_2.12H_2O$, $AlNH_4(SO_2)_2.12H_2O$, $C_6H_{10}Ca.12H_2O$, or mixtures thereof.

A blowing agent is preferably used to form low ratio expanded foam products with the protein/starch/natural cellulosic fiber thermoplastic compositions within the scope of the present invention. Water can function as a primary blowing agent, but physical and chemical blowing agents are preferably used as auxiliary blowing agents. The physical blowing agent can include ethanol, 2-propanol, acetone, hydrocarbons, butanes, n-pentanes, hexanes, chlorofluorocarbons, or combinations thereof.

The physical blowing agent can also include a compressed gas such as nitrogen or carbon dioxide. When a compressed gas is used, it can be mixed and dispersed in the protein/starch composition with natural cellulosic fiber. For example, carbon dioxide is pumped into a co-rotating twin screw extruder, such as the Leistritz AG LSM 34, with mixer zone, under the pressure about 1000 psi. The carbon dioxide dissolves within the protein/starch composition. A currently preferred concentration of carbon dioxide is about 0.5 to 4 wt. %.

Chemical blowing agents include exothermal and exothermal decomposition compounds. Exothermal blowing agents release more energy during decomposition than needed to initiate decomposition. once decomposition has started it continues spontaneously and even goes on for some time when the energy supply has been stopped. Parts foamed with exothermal blowing age nts must be cooled intensely to avoid post expansion. Hydrazides and azo compounds, such as azodicarbonamide and modified Azodicarbonamide, p,p '-oxybis (benzenesulfonyl hydrazide), and p-toluene sulfonyl hydrazide, are important exothermal blowing agents.

Endothermal blowing agents need energy to decompose. For this reason, gas release quickly stops after termination of heat supply. Bicarbonate and citric acid are common base materials used for endothermal blowing agents. These are common food additives which are safe to handle and ingest. One preferred endothermal blowing agent sold commercially as HYDROCEL® BIF by B.I Chemicals, Inc., Montvale, N.J. has been found to provide good results. The amount of chemical blowing agents is about 0.5 to 4 wt. %, preferably BIF about 1 to 2 wt. % of the protein/starch thermoplastic composition.

Nucleating agents are important in producing a uniform, fine-cellular foam structure. Typical nucleating agents include gaseous and liquid compounds, carbon dioxide, nitrogen, sodium bicarbonate, citric acid, and sodium citrate. Three mechanisms can be used to explain nucleating agents.

First, nucleating agents can produce a super saturated solution of gas in the composition and can form fine bubbles prior to the action of a blowing agent. This type of nucleating agent includes carbon dioxide, nitrogen, sodium bicarbonate, citric acid, and sodium citrate.

Second, nucleating agents can be finely dispersed organic, inorganic, and metal powders that act by forming "hot spots." Some metallic salt hydrates and calcium carbonate can also function as nucleating agents in this manner.

Third, nucleating agents can be finely dispersed compounds which facilitate formation of nucleation centers for the gaseous phase of the blowing agent. This is the "classical" operation of nucleating agents. These nucleating agents include talc, silicon dioxide, diatomaceous earth, kaolin, etc. Talc is a presently preferred nucleating agent used at concentrations from about 0.5 to 1.0 wt. %.

Lubricants are preferably used to reduce the processing torque and lower energy input for processing. The amount of lubricant in the protein/starch thermoplastic is preferably about 0.5 to 2 wt. %. The suitable lubricants include castor oil, corn oil, soybean oil, lecithin, fatty acids, monoglycerides, diglycerides, esters of fatty acids and polyhydroxy alcohols, and combinations thereof.

Coloring agents can be included in the compositions within the scope of the present invention to produce articles of a desired color. Suitable coloring agents may include synthetic coloring agents and natural agents. The synthetic coloring agents include azo dyes such as Amaranth, ponceau 4R, Tartrazine, Sunset Yellow, Indigo Carmine. Natural coloring agents include xanthophyll, chlorophyll, and metallic oxides. The amount of coloring agents included in the protein/starch compositions is typically from about 0.0005 to 0.05 wt. %.

In order to provide desired properties of articles made with the protein/starch compositions within the scope of the present invention, other additives may be included such as cross-linking reagents, modifiers, preservatives, bactericides, flavoring agents, or surface active agent such as, soybean phospholipids and calcium or sodium stearyl lactylate, sorbitan fatty acid ester, polyoxyethylene sorbitan monostearate.

Natural cellulosic fiber is used as a reinforcing filler in the present invention. Natural cellulosic fibers enhance physical properties of foamed products, such as tensile strength, compression strength, rigidity modulus, improve heat insulation property, and reduce shrinkage and deformation of the products in processing and use. Typical natural cellulosic fibers used in the present invention include grass fibers, wood fibers, chopped straw, chopped corn straw, bagasse, cotton fibers, chopped leaves, chopped corn husks, hemp fibers, and cellulosic fiber made of other natural plants and their derivatives, or mixtures thereof. Pretreatment of natural cellulosic fibers is usually necessary in most cases. Such pretreatment includes cleaning, drying, grinding, coloring, or treatment by some suitable additives. The fibers final dimension is preferably in the range from about 40 to 100 mesh.

Modifiers can be used to enhance the mechanical properties of protein/starch/natural cellulosic fiber composition, and also to improve the processing properties, such as foaming properties. Typical modifiers which can be used in the present invention include synthetic polymers, such as polyvinyl alcohol, polylactic acid, polycaprolactone, polyesteramide, or natural biopolymers such as, sodium alginate, lignose, and gum. The modifiers are typically present in the composition at a concentration from about 5 to 20 wt. %, but modifiers can range from 0 to 25 wt. % of the composition.

During processing low ratio expanded foam of protein/starch/natural cellulosic fibers plastics, the extrusion cross-linking reaction can be used for formation of intermolecular cross-linkages between the protein, starch, and cellulosic fibers.

The physical properties of low ratio expanded foam of protein/starch/natural cellulosic fibers plastics, such as rigidity, thermal resistance, and water resistance, was improved by cross-linking reaction. Because of three-dimensional cross-linked network formation, the cross-linking agent can be a bifunctional cross-linking reagents which is a reagent with two reactive groups capable of reacting to form bridges between the side chains of the protein and starch or cellulosic fibers. The cross-linking reaction includes intramolecular cross-linking and intermolecular cross-linking with amino, amido, hydroxyl, sulfhydryl groups. Examples of such cross-linking reagents include haloacetate cross-linkers, bisimidoester cross-linkers, bis-n-hydroxysuccinimidyl esters, dialdehyde cross-linkers, and diketone cross-linkers. The cross-linking agent can be also a monofunctional reagent, such as a monofunctional imidoester (methyl acetimidate), thiolesters, aldehydes, such as formaldehyde, glutaraldehyde, furfural, etc. Some epoxides can be used as cross-linking agents, such as epichlorohydrin. Generally, the cross-linking agents can be used in the composition at a concentration from about 1–5 wt. %.

In preparing a low ratio expanded foam from a protein/starch composition with natural cellulosic fiber all the ingredients can be premixed in a continuous high speed mixer. Further mixing and pelletizing can be performed in a co-rotating twin screw extruder with a rod die (L/D of 3:1). The twin screw extruder is preferably a multi mode twin screw with co-rotation screw. All the ingredients also can be directly mixed in the twin screw extruder. The ingredients are fed into the extruder from individual hoppers in predetermined sections of the twin screw extruder.

The processing conditions can be varied as necessary to achieve effective mixing and to form homogeneous pellets. For instance, the temperature distribution along the extruder, pressure, screw speed and configuration, feed rate of the ingredients, and throughput rate can vary.

Second, after mixing and pelletizing the pellets may be used directly in a single extruder with foam die, or allowed to adjust the moisture content by drying for later use. The low ratio expanded foam may be continually processed from the pellets by control blowing conditions and automatic feeding the pellets in the single extruder. The extrusion foaming conditions such as extruder temperature profile, die pressure, feeding rate, screw speed, throughput rate, and take off speed, can be varied to control mechanical properties of the protein/starch/natural cellulosic fiber plastics. The low ratio expanded foam may be directly processed with a gear pump and a foam die.

A useful mixing twin screw extruder is a co-rotating twin screw extruder, Leistritz Micro-18. A useful single extruder used for low ratio expanded foam is a Brabender 1¾ inch extruder, type PL2100 extruder with a standard single screw and a foam die, L/D of 30:1 and compression ratio of 3:1.

The properties of low ratio foam compositions, to a great extent, are determined by the extrusion processing step, during which the decomposition of the blowing agents occurs. At that point, the temperature, pressure, and viscosity affect foaming characteristics.

Low ratio expanded foam compositions within the scope of the present invention may be processed into food packages by an in-line roller thermoforming machine, wherein direct pressure and vacuum is applied to an extrusion foam sheet to conform it to the mold. Other packages, for example, structural foam packages for articles can be made by injection molding, or by compression molding, transfer molding, or other suitable molding techniques.

In the presently preferred processing method, the extrusion temperature in making pellets is about 100 to 120° C.

having a water content of about 8 to 18 wt. %. The temperature in extrusion foam sheet processing is preferably about 150 to 160° C. near the foam die, but this can vary based on the formulation ingredients. The low ratio expanded foam made of protein/starch composition with natural cellulosic fibers preferably has a closed cell structure, a low density of about 0.1 to 0.8 g/cc, extrusion expansion ratio of about 2 to 8, tensile strength of about 0.3 to 12 MPa, and a resilience above 80%.

A useful feature of protein/starch/natural cellulosic fiber compositions within the scope of the present invention is they can be comprised entirely of nontoxic ingredients, and can be safely consumed by humans or animals. This also facilitates recycling or biodegrading the compositions. Low ratio foams prepared from the protein/starch/natural cellulosic fiber compositions are useful for food packaging.

In order to further describe the present invention, the following detailed examples are provided. It should be understood that these examples are not meant to limit the scope of the invention that has been set forth in the foregoing description.

The mechanical properties of low ratio expanded foam made of protein/starch thermoplastics composition with natural cellulosic fibers were tested according to standard American Society for Testing and Materials (ASTM) procedures. The tensile strength of the foams were tested according to ASTM standard method D3574. The density was tested according to ASTM standard method D1622. The compressive strength was tested according to ASTM standard method D1621. The resilience was tested according to ASTM standard method D3574.

EXAMPLE 1

Mechanical properties of the low ratio expanded foam of protein/starch composition Low ratio expanded foams were made of protein/starch thermoplastic compositions formulated with protein including soy protein isolate, or wheat gluten, starch including corn starch, tapioca starch (including hydroxypropylate tapioca starch and cross-linked tapioca starch), hydroxypropylate high amylose starch, glycerol, blowing agent (BIF), talc, $CaCO_3$, and lecithin, as shown in Table 1 below.

The ingredients were premixed together in a high speed mixer (Henschel Mixers America, Inc., FM10 heater mixers) at room temperature. The granulation of the ingredients was processed by a Leistritz Micro-18 co-rotating twin screw extruder having five barrel zones having the following temperature profile: zone 1/zone 2/zone 3/zone 4/zone 5/zone 6=100–110/110–125/115–130/120–130/105–115/90–110° C. The die temperature was 90 to 96° C. The screw speed was 60 to 90 rpm. The die pressure was 190 to 460 psi. After the extrudate was granulated, the moisture content of the granules was measured by a moisture analyzer (Ohaus model MB200) at 130° C. for 30 minutes. The moisture content of the granules was between 8 to 18 wt. %.

The granules were processed into a low ratio expanded foam. The granules were fed through a hopper to a single screw extruder (Brabender Model PL2100 with 1¼ inch, L/D 30:1, compression ratio 3:1) with a 10 inch adjustable foam die. The temperature zone 1/zone 2/zone 3/zone 4/die was 110/135/150–160/165/135–140° C., respectively. The screw speed was 35 to 45 rpm.

The mechanical properties of the low ratio expanded foam were measured by Instron 4465 testing machine according to ASTM D3574 and D1622. In Table 1, the results show that various proteins can be combined with various starches, such as corn starch, modified tapioca starch, (hydroxypropylate tapioca starch, cross-linked tapioca starch) and hydroxyte propylate amylose starch. The results also shown that the low ration expanded foam can be processed from protein/starch composition by standard single screw extruders with foam die, and the formed low ratio expanded foam possess good physical properties.

ingredients were processed by a Leistritz Micro-18 extruder. The temperature profile was: zone 1/zone 2/zone 3/zone 4/zone 5/zone 6=100/110/115/120/110/100° C., die temperature 92 to –100° C., screw speed 60 rpm, die pressure 180 to 360 psi. The moisture content of the granulates was measured by a moisture analyzer.

The granulates were processed into low ratio expanded foam by Brabender Model PL 2100 with 1¼ inch extruder with foam die. The physical properties of the low ratio expanded foam were measured as described in Example 1 above. The processing temperature profile was: zone 1/zone 2/zone 3/zone 4/zone 5/die=110/135/150/170/130–145° C. The screw speed was between 40 and 60 rpm. In Table 2,

TABLE 1[1]

| | | | | | | | | | Moisture | Mechanical Properties | | | | |
| --- | --- | --- | --- | --- | --- | --- | --- | --- | --- | --- | --- | --- | --- | --- |
| Sample | Protein[2] | Starch[3] | Glycerol[4] | Water | BIF[5] | Talc[6] | CaCO$_3$[7] | Lecithin[8] | Content Granulates (%) | Tensile Stress (MPa) | Elongation (%) | Young's Modulus (MPa) | Density of Foam (g/cc) | Expanded Ratio |
| 1 | 100 | 400 | 50 | 200 | 8.6 | 6 | 6 | 5 | 14.0 | 0.72 | 5.58 | 61.76 | 0.29 | 3.3 |
| 2 | 100 | 500 | 150 | 200 | 4.0 | 6 | 0 | 5 | 14.0 | 0.31 | 25.30 | 14.93 | 0.12 | 5.2 |
| 3 | 100 | 150 | 75 | 100 | 4.3 | 2.5 | 3 | 2.5 | 11.7 | 1.81 | 1.97 | 160.44 | 0.37 | 2.4 |
| 4 | 100 | 150 | 75 | 100 | 4.3 | 2.5 | 3 | 2.5 | 11.7 | 0.49 | 62.82 | 11.12 | 0.31 | 2.8 |
| 5 | 100 | 150 | 75 | 100 | 4.3 | 2.5 | 3 | 2.5 | 11.7 | 0.31 | 38.87 | 14.34 | 0.19 | 4.0 |

[1]Ingredients: by parts based on protein as 100 parts.
[2]Samples 1, 3, 4, and 5 contain soy protein isolate from Archer Daniels Midland Company, N066-646; Sample 2 contains wheat Gluten from Cerestar USA, Inc., Gluvital 21000.
[3]Samples 1 and 2 contain a modified high amylose starch, Cerestar USA, Inc., Star C, delight 90730; Samples 3 and 4 contain tapioca starch; Sample 3 is T1 Star American: T1 Star A (food grade modified tapioca starch); Sample 4 is T1 Star C (a food grade modified starch); Sample 5 is corn starch from Cerestar USA, Inc., Gel 03420 (native common corn starch).
[4]Glycerol (Aldrich Chemical Co., Inc.).
[5]BIF is blowing agent from Boehringer Ingelheim Chemicals, Inc.
[6]Talc (Aldrich Chemical).
[7]Calcium Carbonate (EM Industries, Inc.).
[8]Lecithin (Alfa Aesar).

EXAMPLE 2

Low ratio expanded foam of protein/starch composition with varying concentration of natural cellulosic fiber A low ratio expanded foam was made of a protein/starch composition with natural cellulosic fiber formulated with soy protein isolate, corn starch, varying concentrations of natural wood fibers, 10 to 40 wt. % based on protein/starch composition, glycerol, water, blowing agent (BIF), nucleating agent (talc, CaCO$_3$), and lubricant (lecithin) as shown in Table 2 below. The ingredients were premixed together as described in Example 1 above. The granulation of the results indicate that the natural wood fibers, more than 20 wt. % based on total weight of low ratio expanded foam protein/starch composition, can be combined as reinforcement fiber with protein/starch composition in the low ratio expanded foam, and show that the low ratio expanded foam displayed enhanced compressive strength, tensile strength, and Young's modulus. The results also show lower density and good resilience of the compositions. When the natural wood fiber as reinforcement fiber was increased from 10 wt. % to above 20 wt. % based on total weight of low ratio expanded foam of protein/starch composition.

TABLE 2[1]

| Sample | Soy Protein Isolate | Corn Starch[2] | Glycerol | Water | Natural Wood Fibers[3] | BIF | Talc | CaCO$_3$ | Lecithin |
| --- | --- | --- | --- | --- | --- | --- | --- | --- | --- |
| 1 | 100 | 150 | 75 | 100 | 28 | 4.3 | 2.5 | 3 | 2.5 |
| 2 | 100 | 150 | 75 | 100 | 55.5 | 4.3 | 2.5 | 3 | 2.5 |
| 3 | 100 | 150 | 75 | 100 | 83.5 | 4.3 | 2.5 | 3 | 2.5 |
| 4 | 100 | 150 | 75 | 100 | 111 | 4.3 | 2.5 | 3 | 2.5 |

[1]Ingredients: by parts based on soy protein isolate as 100 parts; ingredient sources are same as listed in Table 1 except for corn starch and natural wood fiber.

TABLE 2[1]-continued

| | Moisture | Mechanical properties | | | | | | |
|---|---|---|---|---|---|---|---|---|
| Sample | Content of Granules (%) | Tensile Stress (MPa) | Elongation (%) | Young's Modulus (MPa) | Density of foam (g/cc) | Expans. Ratio | Compres. Strength (MPa) | Resilience (%) |
| 1 | 17.0 | 0.42 | 29.51 | 19.27 | 0.19 | 3.1 | 0.72 | 91.2 |
| 2 | 17.0 | 0.64 | 9.64 | 60.83 | 0.33 | 2.6 | 1.28 | 91.1 |
| 3 | 17.0 | 0.77 | 5.08 | 166.33 | 0.36 | 2.3 | 1.62 | 90.8 |
| 4 | 17.0 | 1.12 | 2.04 | 161.87 | 0.42 | 2.1 | 1.66 | 89.6 |

[2]Corn starch: Cerestar USA, Inc., Polar Tex 05735 (a cross-linked native corn starch, hydroxypropyl distarch phosphate)
[3]Wood fiber: American Wood Fibers: No. 4010 (particle size distribution 60 mesh 35 to 80 wt. %, 80 Mesh 15 to 50 wt. %).

EXAMPLE 3

Low ratio expanded foam of protein/starch composition with various natural cellulosic fiber A low ratio expanded foam was made of a protein/starch composition formulated with soy protein isolate, corn starch, glycerol, water, chemical blowing agent (BIF), nucleating agent (talc, $CaCO_3$), lubricant (lecithin), and various natural cellulosic fibers (bagasse, chopped corn straw, chopped straw, wood fibers, grass fibers) as shown in Table 3 below.

The ingredients were premixed together as described in Example 1 above. The granulation temperature profile was zone 1/zone 2/zone 3/zone 4/zone 5/zone 6=100/110/115/ 120/110/95° C. The die temperature was about 95° C., the screw speed was 60 rpm, and the die pressure was from 400 to 600 psi. The moisture content of the granulates was measured by a moisture analyzer. Moisture content was about 15.0 to 18.0 wt. %. The granulates were processed into low ratio expanded foam as described in Example 1. The processing temperature profile was zone 1/zone 2/zone 3/zone 4/zone 5/die=105/135/150/165/135–140° C., screw speed 40 to 60 rpm. The physical properties were measured as described in Example 1 above. The results are shown in Table 3.

In Table 3, the results indicate that various natural cellulosic fibers such as bagasse, chopped corn straw, chopped straw, wood fibers, grass fibers as reinforcement material can be combined with protein/starch composition in the low ratio expanded foam. The low ratio expanded foam displayed enhanced tensile strength and Young's modulus because of the various natural cellulosic fibers included in the low ratio expanded foam. The higher tensile strength of natural cellulosic fibers can be used to obtain higher tensile strength of low ratio expanded foams made from protein/starch/natural cellulosic fiber plastics.

Finally, articles were made from the low ratio expanded foam by thermoforming. The results show that the properties of products in use were improved, such as reduced shrinkage and deformation, improved heat insulation property, enhanced dimensional stability. All of the natural cellulosic fibers used in the compositions are fully biodegradable and friendly to the environment.

TABLE 3[1]

| | | | | | | | | | | Moisture | Mechanical properties | | | |
|---|---|---|---|---|---|---|---|---|---|---|---|---|---|---|
| Sample | Soy Protein Isolate | Corn Starch | Glycerol | Water | Natural Wood Fibers[2] | BIF | Talc | $CaCO_3$ | Lecithin | Content of Granulates (%) | Tensile Stress (MPa) | Elongation (%) | Young's Modulus (MPa) | Density of foam (g/cc) |
| 1 | 100 | 66.7 | 40 | 66.7 | 41.7 | 2.9 | 1.7 | 2 | 1.7 | 15.2 | 4.26 | 1.66 | 459.01 | 0.75 |
| 2 | 100 | 66.7 | 40 | 66.7 | 41.7 | 2.9 | 1.7 | 2 | 1.7 | 15.0 | 3.63 | 3.97 | 482.03 | 0.85 |
| 3 | 100 | 66.7 | 40 | 66.7 | 41.7 | 2.9 | 1.7 | 2 | 1.7 | 18.0 | 3.75 | 0.53 | 506.40 | 0.73 |
| 4 | 100 | 66.7 | 40 | 66.7 | 41.7 | 2.9 | 1.7 | 2 | 1.7 | 15.3 | 2.91 | 1.23 | 335.98 | 0.67 |
| 5 | 100 | 150 | 75 | 100 | 80 | 4.3 | 2.5 | 3 | 2.5 | 16.4 | 1.10 | 19.02 | 96.72 | 0.58 |

[1]Ingredients are by parts based on soy protein isolate as 100 parts; ingredients sources are same as listed in Table 1 and Table 2 except for natural cellulosic fibers.
[2]Various natural cellulosic fibers: sample 1: bagasse fibers (moisture content 10.1 wt. %); sample 2: chopped corn straw (moisture content 7.0 wt. %); sample 3: chopped straw (moisture content 6.9 wt. %); sample 4: wood fibers (moisture content 9.8 wt. %); sample 5: grass fibers (moisture content 6.9 wt. %), (except wood fibers, the particle size distribution 40 mesh, 85 to 99 wt. %, 30 mesh 10 wt. %).

EXAMPLE 4

Our testing results show that various metallic salt hydrates improve the mechanical properties of protein/starch plastics. Tables 4–5 show a comparison between calcium chloride dihydrate, calcium nitrate hydrate, and aluminum potassium sulfate hydrate. The Tables show that calcium nitrate hydrate improves the tensile strength and elongation of protein/starch plastics better than calcium chloride dihydrate. Aluminum potassium sulfate hydrate also shows good improvement in mechanical properties. Metallic salt hydrates usually enhance elongation and tensile strength and slightly decrease Young's modulus. Metallic salt hydrates can be used to improve flexibility of protein/starch plastics. Table 5 shows that the aluminum potassium sulfate lowers the melt pressure, thereby enhancing processing flowability.

TABLE 4

The effect of different metallic salt hydrates on mechanical properties of protein/starch plastics

| | Ingredients (by parts) | | | | Mechanical Properties | | |
|---|---|---|---|---|---|---|---|
| | | | | | | Tensile | Young's |
| SPI | CS | Glycerol | Moisture Content | Metallic Salt | Strength (MPa) | Elongation (%) | Modulus (MPa) |
| 100 | 66.7 | 40 | 37.5 | 7.5 $CaCl_2 \cdot 2H_2O$ | 8.91 | 26.09 | 178.00 |
| 100 | 66.7 | 40 | 37.5 | 7.5 $Ca(NO_3)_2 \cdot 4H_2O$ | 9.48 | 38.83 | 175.90 |
| 100 | 66.7 | 40 | 37.5 | 7.5 $AlK(SO_4)_2 \cdot 12H_2O$ | 8.49 | 38.02 | 141.70 |

1. Moisture content of testing standard bar (by injection molding at 140° C.): 10.0%
2. SPI is soy protein isolate (No. 66-646 ADM); CS is corn starch (CGel 03420).

TABLE 5

The effect of different metallic salt hydrate on processing flowability of protein/starch plastics

| | | Processing Condition | | | |
|---|---|---|---|---|---|
| No. | Sample | T die (° C.) | Screw RPM | Feeder Rate | Melt Pressure (psi) |
| 1 | $CaCl_2 \cdot 2H_2O$ | 105 | 60 | 18 | 650 |
| 2 | $Ca(NO_3)_2 \cdot 4H_2O$ | 105 | 60 | 18 | 690 |
| 3 | $AlK(SO_4)_2 \cdot 12H_2O$ | 105 | 60 | 18 | 585 |

1. Same ingredients as Table 4.
2. Processing equipment: Leistritz Micro 18 twin screw co-rotation intermeshing mode extruder, L/D 40:1.
3. Processing temperature: zone 1, 105° C.; zone 2, 110° C.; zone 3, 121° C.; zone 4, 125° C.; zone 5, 120° C.; zone 6, 101° C.

Table 6 shows the effect of calcium chloride dihydrate on mechanical properties and water absorption of soy protein plastics. The tensile strength and Young's modulus was decreased a little, but the elongation was greatly enhanced. The water resistance of the soy protein plastics was enhanced too. The metallic salt hydrates also appear to function as a plasticizer because of their humidification function and retention of moisture in the finished products.

Table 7 shows the effect of aluminum potassium sulfate hydrate on mechanical properties and water absorption of soy protein plastics. Table 7 shows that the tensile strength, elongation, and Young's modulus was enhanced with increasing aluminum potassium sulfate hydrate content in the soy protein plastics. Table 7 further shows the water resistance of soy protein plastics was enhanced too. The preferred content of aluminum potassium sulfate hydrate is about 4 wt. %. It is currently believed beneficial properties are obtained with aluminum potassium sulfate hydrate because it is a complex salt. Because the water resistance was improved, it is also believed the protein, aluminum potassium sulfate and water complex and cross-link.

TABLE 6

The effect of calcium chloride dihydrate on mechanical properties of soy protein plastics

| | Ingredients (by parts) | | | | Water | Mechanical Properties | | |
|---|---|---|---|---|---|---|---|---|
| | | | | | | Tensile | | Young's |
| SPI | Glycerol | Moisture Content | $CaCl_2 \cdot 2H_2O$ | Pellets (M.C. %) | Absorption (%) 24 Hr. | Strength (MPa) | Elongation (%) | Modulus (MPa) |
| 100 | 20 | 80 | 0 | 21.87 | 147.83 | 7.68 | 32.26 | 96.46 |
| 100 | 20 | 80 | 2 | 21.00 | 83.07 | 7.24 | 59.49 | 82.56 |
| 100 | 20 | 80 | 4 | 22.38 | 72.11 | 7.42 | 66.70 | 77.24 |
| 100 | 20 | 80 | 6 | 23.00 | 73.67 | 8.15 | 65.34 | 87.98 |
| 100 | 20 | 80 | 8 | 21.42 | 78.73 | 7.39 | 85.33 | 75.10 |

1. Moisture content of testing standard bar (by injection molder at 140° C.): 12.0%
2. Processing condition same as Table 5.
3. SPI is soy protein isolate (No. 66-646 ADM).

TABLE 7

The effect of aluminum potassium sulfate hydrate
on mechanical properties of soy protein plastics

| Ingredients (by parts) | | | | Pellets (M.C. %) | Water Absorption (%) 24 Hr | Mechanical Properties | | |
|---|---|---|---|---|---|---|---|---|
| SPI | Glycerol | Moisture Content | $AlK(SO_4)_2 \cdot 12H_2O$ | | | Tensile Strength (Mpa) | Elongation (%) | Young's Modulus (Mpa) |
| 100 | 20 | 80 | 0 | 23.70 | 137.60 | 7.68 | 32.26 | 96.46 |
| 100 | 20 | 80 | 2 | 23.70 | 111.70 | 7.86 | 43.14 | 98.75 |
| 100 | 20 | 80 | 4 | 23.70 | 101.52 | 7.83 | 50.09 | 104.05 |
| 100 | 20 | 80 | 6 | 23.70 | 87.07 | 8.89 | 44.17 | 97.43 |
| 100 | 20 | 80 | 8 | 23.70 | 74.93 | 8.54 | 13.60 | 110.13 |

1. Moisture content of testing standard bar (by injection molding at 140° C.): 12.0%.
2. Processing condition same as Table 5.
3. SPI is soy protein isolate (No. 66-646 ADM).

In some cases, the metallic salt hydrate was added to improve the flexibility of products and to decrease some plasticizer content. The metallic salt hydrate can also improve the foaming properties of soy protein plastics.

EXAMPLE 5

The effect of different metallic salt hydrates on mechanical properties of foam sheet of protein/starch/natural cellulosic fiber plastics Table 8 shows that the effect of different metallic salt hydrates on mechanical properties of protein/starch/natural cellulosic fiber plastics. Sample 1 is a control composition lacking a metallic salt hydrate. Samples 2–6 are identical, except for the metallic salt hydrate used.

In samples 1 to 3, calcium chloride dihydrate and zinc acetate dihydrate enhanced the elongation and improved flexibility of the foam sheet of protein/starch/natural cellulosic fiber plastic. In samples 4 and 5, calcium sulfate dihydrate and aluminum potassium sulfate dodecahydrate enhanced the tensile strength and Young's Modulus, thereby improving rigidity of foam sheet, although the elongation was decreased slightly.

Samples 5 and 6 show the effect of aluminum potassium sulfate dodecahydrate content on mechanical properties of protein/starch/natural cellulosic fiber plastics. The tensile strength and Young's Modulus of foam sheet was enhanced by increasing the aluminum potassium sulfate content. Elongation of foam sheet was changed slightly. It is currently believed that aluminum potassium sulfate dodecahydrate, as a complex salt, improves the intermolecular interaction between protein/starch and natural cellulosic fiber due to complexing or cross-linking.

TABLE 8

The effect of different metallic salt hydrate
on mechanical properties of protein/starch
with natural cellulosic fiber plastics

| | Ingredient[1] (Wt. % based on total composition) | | | | | | | | |
|---|---|---|---|---|---|---|---|---|---|
| Sample | Soy Protein Isolate[2] | Corn Starch[3] | Moisture Content | Glycerol | Talc | Lecithin | BIF | Wood Fiber | Metallic Salt Hydrate |
| 1 | 32.0 | 21.3 | 21.3 | 12.8 | 0.5 | 0.5 | 0.9 | 10.7 | 0 |
| 2 | 31.3 | 20.9 | 20.9 | 12.5 | 0.5 | 0.5 | 0.9 | 10.5 | 2[4] |
| 3 | 31.3 | 20.9 | 20.9 | 12.5 | 0.5 | 0.5 | 0.9 | 10.5 | 2[5] |
| 4 | 31.3 | 20.9 | 20.9 | 12.5 | 0.5 | 0.5 | 0.9 | 10.5 | 2[6] |
| 5 | 31.3 | 20.9 | 20.9 | 12.5 | 0.5 | 0.5 | 0.9 | 10.5 | 2[7] |
| 6 | 31.3 | 20.9 | 20.9 | 12.5 | 0.5 | 0.5 | 0.9 | 10.5 | 1[8] |

[1]Ingredients; wt. % based on total composition; other ingredient sources same as list in Examples 1 and 2.
[2]Soy Protein Isolate, No. 66-646 (Archer Daniels Midland Company)
[3]Corn Starch, C Polar Tex 05735, hydroxypropyl distarch phosphate (Cerestar)
[4]Calcium Chloride Dihydrate ($CaCl_2 \cdot 2H_2O$) Aldrich Chemical Company, Inc.)
[5]Zinc Acetate, ($C_4H_6O_4Zn \cdot 2H_2O$) (SIGMA)
[6]Calcium Sulfate, ($CaSO_4 \cdot 2H_2O$) (SIGMA)
[7]Aluminum Potassium Sulfate ($AlK(SO_4)_2 \cdot 12H_2O$) (SIGMA)
[8]Aluminum Potassium Sulfate ($AlK(SO_4)_2 \cdot 12H_2O$) (SIGMA)

TABLE 8-continued

The effect of different metallic salt hydrate
on mechanical properties of protein/starch
with natural cellulosic fiber plastics

| | | | Mechanical Properties | | | |
|---|---|---|---|---|---|---|
| Sample | Pellets Moisture Content (%) | Moisture Content of Foam Sheet (%) | Density of Foam Sheet (g/cc) | Tensile Stress (MPa) | Elongation (%) | Young's Modulus (MPa) |
| 1 | 16.2 | 11.8 | 0.74 | 1.76 | 8.08 | 126.32 |
| 2 | 16.2 | 11.8 | 0.78 | 1.69 | 8.88 | 101.83 |
| 3 | 16.0 | 12.0 | 0.74 | 1.44 | 9.25 | 128.73 |
| 4 | 16.7 | 11.4 | 0.55 | 2.37 | 7.43 | 204.60 |
| 5 | 16.8 | 11.8 | 0.75 | 2.84 | 5.97 | 852.36 |
| 6 | 16.0 | 11.7 | 0.70 | 2.02 | 8.42 | 348.44 |

The biodegradable thermoplastic composition ingredients were granulated by a Leistritz micro 18 twin screw extruder. The extruder temperature was Zone 1/Zone 2/Zone 3/Zone 4/Zone 6/zone 6=110/110/115/120/110/100° C. The die temperature was between 88 and 95° C. The screw speed was 60 rpm. The die pressure was 320–600 psi.

A low ratio expanded foam sheet was processed by a Brabender Model PL2100 with 1¼ inch extruder and foam die. The processing temperature profile was Zone 1/Zone 2/Zone 3/Zone 4/Zone 5/(die)=110/135/145/150/135–140° C. The screw speed was 40 rpm. The take off speed of the foam sheet was 28 inch/min. The extrusion pressure was between 400 and 962 psi. The extruder torque was 6000 to 13,000 (MG). The temperature near the die was 152±1° C.

starch on the mechanical properties of foam sheet of protein/starch/natural cellulosic fiber plastics. In sample 1, the starch is a common corn starch. In sample 2, the starch is a stabilized and cross-linked common corn starch, hydroxypropyl distarch phosphate. Table 9 also shows that cross-linked starch phosphate has a higher elongation and better flexibility. The tensile strength and Young's Module of the foam sheet was decreased. Because hydroxypropyl distarch phosphate shows lower hot paste viscosity, withstands a wide range of processing conditions, and has better storage stability than common corn starch, and it is one preferred starch for use in the protein/starch/natural cellulosic fiber composition.

TABLE 9

The effect of modified starches on mechanical properties
of protein/starch/natural cellulosic fiber plastics.

| | Ingredient (wt. % based on total composition) | | | | | | | |
|---|---|---|---|---|---|---|---|---|
| Sample | Soy Protein Isolate | Corn Starch | Moisture Content | Glycerol | Talc | Lecithin | BIF | Natural Wood Fiber |
| 1 | 31.3 | 20.9[1] | 20.9 | 12.5 | 0.5 | 0.5 | 0.9 | 10.5 |
| 2 | 31.3 | 20.9[2] | 20.9 | 12.5 | 0.5 | 0.5 | 0.9 | 10.5 |

[1]Common Corn Starch (CGel 03420), Cerestar USA, Inc.
[2]Modified Starch (PolarTex 05735, hydroxypropyl distarch phosphate), Cerestar USA, Inc.
All other ingredient sources are the same as list in Examples 1 and 2. Processing conditions the were same as Table 10.

| | | | Mechanical Properties | | | |
|---|---|---|---|---|---|---|
| Sample | Pellets moisture content (%) | Moisture Content of Foam Sheet (%) | Density of Foam Sheet (g/cc) | Tensile Strength (MPa) | Elongation (%) | Young's Modulus (MPa) |
| 1 | 16.0 | 11.6 | 0.84 | 2.14 | 2.51 | 289.49 |
| 2 | 16.2 | 11.8 | 0.74 | 1.76 | 8.08 | 126.32 |

EXAMPLE 6

The effect of modified starch on mechanical properties of foam sheets of protein/starch/natural cellulosic fiber plastics Table 9 shows a comparison of the effect of a cross-linking modified corn starch and unmodified common corn

EXAMPLE 7

The effect of modifiers on mechanical properties of protein/starch/natural cellulosic fibers plastics The results in Table 10 show that modifiers, such as polyvinyl alcohol, because it has strong intermolecular hydrogen bond and strong affinity for natural cellulosic fibers, can be used to enhance the mechanical properties, such as, flexibility and stability, of low ratio expanded foam of protein/starch/natural cellulosic fibers plastics. The results also show improved expansion uniformity and compressibility properties.

son samples 3 and 4 show that the tensile strength, elongation, Young's Modulus was enhanced with increasing the modifier polyvinyl alcohol content. The flexibility and rigidity of the foam sheet of protein/starch/natural cellulosic

TABLE 10

| | Ingredients (by parts based on corn starch) | | | | | | | |
|---|---|---|---|---|---|---|---|---|
| Sample | Corn Starch[1] | Wheat Gluten[2] | Moisture Content | Glycerol | Modifiers[3] | Natural Wood Fiber | $AlK(SO_4)_2 \cdot 12H_2O$ | Talc |
| 1 | 100 | 25 | 32.5 | 10 | 0 | 25 | 0 | 1.25 |
| 2 | 100 | 25 | 62.5 | 10 | 37.5 | 25 | 0 | 1.25 |
| 3 | 100 | 15 | 62.5 | 0 | 37.5 | 25 | 0 | 1.25 |
| 4 | 100 | 15 | 62.5 | 10 | 25.0 | 25 | 0 | 1.25 |
| 5 | 100 | 15 | 62.5 | 10 | 25.0 | 25 | 5.25 | 1.25 |

[1]Corn Starch (C delight 90730, hydroxypropyl high amylose starch), Cerestar USA, Inc.
[2]Wheat Gluten (Gluvital 21000), Cerestar USA, Inc.
[3]Modifiers polyvinyl alcohol, Av. Mol. Wt. 30,000–70,000, SIGMA Chemical Co.
All other ingredient sources are the same as Examples 1 and 2.

| | | | | | | Mechanical Properties | | |
|---|---|---|---|---|---|---|---|---|
| Sample | Lecithin | $CaCO_3$ | BIF | Pellets Moisture Content (%) | Moisture Content of Foam Sheet (%) | Density of Foam Sheet (g/cc) | Tensile Strength (MPa) | Elongation (%) | Young's Modulus (MPa) |
| 1 | 1.25 | 1.5 | 2.15 | 18.2 | 12.0 | 0.76 | 5.98 | 0.52 | 881.69 |
| 2 | 1.25 | 1.5 | 2.15 | 19.0 | 12.0 | 0.76 | 8.39 | 1.63 | 1171.37 |
| 3 | 1.25 | 1.5 | 2.15 | 19.0 | 12.2 | 0.63 | 9.43 | 1.89 | 1983.58 |
| 4 | 1.25 | 1.5 | 2.15 | 18.0 | 12.0 | 0.67 | 6.53 | 1.06 | 1943.14 |
| 5 | 1.25 | 1.5 | 2.15 | 19.0 | 12.2 | 0.64 | 7.21 | 1.15 | 1613.90 |

The ingredients were premixed together as described in Example 1 above. The granulation temperature profile was Zone 1/Zone 2/Zone 3/Zone 4/Zone 5/Zone 6=100/105/110/110/105/95° C. The die temperature was between 85 to 95° C. The screw speed was 60 rpm. The die pressure was 220 to 550 psi. The moisture content of the granulates was measured by a moisture analyzer. The moisture content of the granulates was about 18.2 to 19.0%. The low ratio expanded foam sheet was processed by a Brabender Model PL2100 with 1¼ inch extruder and 10 inch wide foam die. The processing temperature profile was Zone 1/Zone 2/Zone 3/Zone 4/Zone 5 (die)=110/130/150/160/135° C. The screw speed was 40 rpm. The take off speed of the foam sheet was 46 inch/min.

Table 10 shows the effect of modifiers on mechanical properties of protein/starch/natural cellulosic fibers plastics, such as polyvinyl alcohol, because it has strong intermolecular hydrogen bond and strong affinity for natural cellulosic fibers. Polyvinyl alcohols can be used to enhance the mechanical properties of the low ratio expanded foam of protein/starch/natural cellulosic fibers plastics.

Comparison samples 1 and 2 show that the tensile strength, elongation, Young's Modulus of foam sheet contained polyvinyl alcohol was enhanced obviously. Comparifibers plastics was improved by added modifiers and the density of foam sheet was decreased too. So that the results also showed improved expansion uniformity and compressibility properties of the foam sheet of protein/starch/natural cellulosic fibers plastics. Comparison samples 4 and 5 shown that the tensile strength was enhanced by adding aluminum potassium sulfate hydrate to the foam sheet of containing polyvinyl alcohol modifiers. The aluminum potassium sulfate hydrate helps complex or couple the protein/starch to cellulosic fibers and polyvinyl alcohol.

EXAMPLE 8

The effect of cross-linking reagents on mechanical properties of protein/starch/natural cellulosic fibers plastics during extrusion processing The results show that the cross-linking reagents enhance the tensile strength, Young's Modulus with increasing cross-linking reagents content. The physical properties of low ratio expanded physical foam of protein/starch/natural cellulosic fibers plastics such as rigidity, thermal resistance, and water resistance was improved by cross-linking reaction.

TABLE 11

| | Ingredients (by parts based on corn starch) | | | | | | | |
|---|---|---|---|---|---|---|---|---|
| Sample | Corn Starch[1] | Wheat Gluten[2] | Moisture Content | Glycerol | Modifiers[3] | Cross-linking reagent[4] | Natural Wood Fiber | Talc |
| 1 | 100 | 15 | 62.5 | 10 | 25 | 25 | 25 | 1.25 |
| 2 | 100 | 15 | 62.5 | 10 | 25 | 25 | 25 | 1.25 |

TABLE 11-continued

| | | | | | | | | |
|---|---|---|---|---|---|---|---|---|
| 3 | 100 | 15 | 62.5 | 10 | 25 | 25 | 25 | 1.25 |

[1] Corn Starch (C delight 90730, hydroxypropyl high amylose starch), Cerestar USA, Inc.
[2] Wheat Gluten (Gluvital 21000), Cerestar USA, Inc.
[3] Modifiers polyvinyl alcohol, Av. Mol. Wt. 30,000–70,000, SIGMA Chemical Co.
[4] Cross-linking reagent: glutaric dialdehyde, 50 wt. % solution in water, Aldrich Chemical Company, Inc.
All other ingredient sources are the same as Examples 1 and 2.

| | | | | | Mechanical Properties | | | |
|---|---|---|---|---|---|---|---|---|
| Sample | Lecithin | CaCO$_3$ | BIF | Moisture Content of Foam Sheet (%) | Density of Foam Sheet (g/cc) | Tensile Strength (MPa) | Elongation (%) | Young's Modulus (MPa) |
| 1 | 1.25 | 1.5 | 2.15 | 10.1 | 0.76 | 8.32 | 1.12 | 1046.89 |
| 2 | 1.25 | 1.5 | 2.15 | 10.1 | 0.90 | 8.40 | 1.60 | 1632.89 |
| 3 | 1.25 | 1.5 | 2.15 | 10.1 | 0.67 | 8.09 | 1.72 | 779.32 |

The ingredients were premixed together as described in Example 1. The pH of mixed ingredients was 9.0–9.2. The low ratio expanded foam sheet was processed by a Leistritz Micro-18 extruder with 6 inch sheet diameter. The processing temperature profile was: Zone 1/Zone 2/Zone 3/Zone 4/Zone 5/Zone 6=95/110/120/137/155/120° C. The screw speed was 130 rpm. The die pressure was 180–330 psi. The die temperature was 120° C.

Table 11 shows the effect of cross-linking reagents on mechanical properties of protein/starch/natural cellulosic fibers plastics during extrusion of foam sheets. The cross-linking reagent was glutaric dialdehyde, which is a common homobifunctional reagent. The functional groups, such as amino, imidarole, thiol, and hyroxyl, can be used in suitable cross-linking reagents used to couple protein/starch to cellulosic fibers and polyvinyl alcohol. From the results of samples 1, 2, and 3, the tensile strength and Young's Modulus was increased with increasing glutaric dialdehyde content. The cross-linking reaction is dependent on pH, temperature and ionic strength. Because many cross-linking reagents are toxic, suitable non-toxic ingredients should be used if the final composition is intended to be edible. As discussed above, aluminum potassium sulfate hydrate can be used as a cross-linking reagent.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A biodegradable protein/starch based thermoplastic composition comprising:
   about 10 to 50 wt. % protein;
   about 20 to 50 wt. % starch;
   about 5 to 25 wt. % natural cellulosic fiber;
   about 8 to 20 wt. % water; and
   about 0.5 to 5 wt. % metallic salt hydrate
wherein the composition has a density of about 0.1 to 0.8 g/cubic centimeters.

2. The protein/starch thermoplastic composition according to claim 1, wherein the protein is plant derived protein.

3. The protein/starch thermoplastic composition according to claim 1, wherein the protein is soybean protein.

4. The protein/starch thermoplastic composition according to claim 3, wherein the soybean protein is soy protein concentrate, soy protein isolate, or a combination thereof.

5. The protein/starch thermoplastic composition according to claim 1, wherein the protein is gluten, zein, hordein, avenin, kafirin, or a combination thereof.

6. The protein/starch thermoplastic composition according to claim 1, wherein the protein is animal derived protein.

7. The protein/starch thermoplastic composition according to claim 6, wherein the protein is selected from casein, albumin, collagen, gelatin, keratin, and a combination thereof.

8. The protein/starch thermoplastic composition according to claim 1, wherein the starch is a native, unmodified starch, a chemically modified starch, a pregelatinized starch, or a combination thereof.

9. The protein/starch thermoplastic composition according to claim 1, wherein the starch is a native starch selected from corn starch, high amylose corn starch, potato starch, sweet potato starch, wheat starch, rice starch, tapioca starch, sorghum starch, and a combination thereof.

10. The protein/starch thermoplastics composition according to claim 1, wherein the starch is a chemically modified starch selected from hydroxyethyl starch, hydroxypropyl starch, carboxymethyl starch, acetylated high amylose starch, starch acetate, starch maleate, starch octenylsuccinate, starch succinate, starch phthalate, hydroxypropylate high amylose starch, cross-linked starch, starch phosphates, hydroxy propyl distarch phosphate, cationic starch, starch propionamide, and a combination thereof.

11. The protein/starch thermoplastic composition according to claim 1, wherein the natural cellulosic fiber is a natural plant fiber.

12. The protein/starch thermoplastic composition according to claim 1, wherein the natural cellulosic fiber is selected from grass fibers, wood fibers, chopped straw, bagasse, cotton fibers, chopped leaves, chopped corn husks, hemp fibers, and mixtures thereof.

13. The protein/starch thermoplastic composition according to claim 1, wherein the metallic salt hydrate is a calcium, sodium, potassium, zinc, iron, aluminum or phosphorus salt or a mixture thereof.

14. The protein/starch thermoplastic composition according to claim 1, wherein the metallic salt hydrate is a chloride, carbonate, sulfate, nitrate, lactate, oxalate, or acetate salt or a mixture thereof.

15. The protein/starch thermoplastic composition according to claim 1, wherein the metallic salt hydrate is $CaCl_2 \cdot 2H_2O$, $Ca(NO_3)_2 \cdot 4H_2O$, $CaSO_4 \cdot 2H_2O$, $AlK(SO_4)_2 \cdot 12H_2O$, $AlNH_4(SO_2)_2 \cdot 12H_2O$, $C_6H_{10}Ca \cdot 12H_2O$, or a mixture thereof.

16. The protein/starch thermoplastic composition according to claim 1, further comprising a plasticizer selected from glycerol, ethylene glycol, 1,3-propanediol, propylene glycol, 1,3-trimethylene glycol, sorbitol, sorbitan, mannitol, diglycerol, 1,2,3-hexanetriol, butanediol, butanetriol, urea, glycerol monoacetate, glycerol diacetate, and a mixture thereof.

17. The protein/starch thermoplastic composition according to claim 1, further comprising an endothermal or exothermal blowing agent.

18. The protein/starch thermoplastic composition according to claim 1, further comprising a physical blowing agent.

19. The protein/starch thermoplastic composition according to claim 1, further comprising a lubricant selected from castor oil, corn oil, soybean oil, lecithin, fatty acids, monoglycerides, diglycerides, esters of fatty acids and polyhydroxy alcohols, and a combination thereof.

20. The protein/starch thermoplastic composition according to claim 1, further comprising a nucleating agent is selected from sodium bicarbonate, citric acid, sodium citrate, talc, silicon dioxide, calcium carbonate or a combination thereof.

21. The protein/starch thermoplastic composition according to claim 1, further comprising a coloring agent.

22. The protein/starch thermoplastic composition according to claim 1, further comprising a preservative.

23. The protein/starch thermoplastic composition according to claim 1, further comprising about 5 to 20 wt. % modifier to improve mechanical and processing properties of the protein/starch thermoplastic composition.

24. The protein/starch thermoplastic composition according to claim 23, wherein the modifier is polyvinyl alcohol, polylactic acid, polycaprolactone, polyester amide or a natural biopolymer.

25. The protein/starch thermoplastic composition according to claim 24, wherein the natural biopolymer is sodium alginate, lignose, or carbohydrate gum.

26. A biodegradable, low ratio, expanded foam made of protein/starch based thermoplastic composition with natural cellulosic fiber comprising:
about 10 to 46 wt. % protein;
about 20 to 46 wt. % starch;
about 5 to 25 wt. % natural cellulosic fiber;
about 8 to 20 wt. % water;
about 5 to 25 wt. % plasticizer;
about 0 to 4 wt. % blowing agent;
about 0.5 to 2 wt. % nucleating agent;
about 0.5 to 2 wt. % lubricant;
about 0.5 to 5 wt. % metallic salt hydrate; and
about 0 to 25 wt. % modifier to improve mechanical and processing properties of the protein/starch based thermoplastic composition,
wherein the composition has a density of about 0.1 to 0.8 g/cubic centimeters.

27. The protein/starch thermoplastic composition according to claim 26, wherein the protein is plant derived protein.

28. The protein/starch thermoplastic composition according to claim 27, wherein the protein is soybean protein.

29. The protein/starch thermoplastic composition according to claim 28, wherein the soybean protein is soy protein concentrate, soy protein isolate, or a combination thereof.

30. The protein/starch thermoplastic composition according to claim 27, wherein the protein is gluten, zein, hordein, avenin, kafirin, or a combination thereof.

31. The protein/starch thermoplastic composition according to claim 26, wherein the protein is animal derived protein.

32. The protein/starch thermoplastic composition according to claim 31, wherein the protein is selected from casein, albumin, collagen, gelatin, keratin, and a combination thereof.

33. The protein/starch thermoplastic composition according to claim 26, wherein the starch is a native, unmodified starch, a chemically modified starch, a pregelatinized starch, or a combination thereof.

34. The protein/starch thermoplastic composition according to claim 26, wherein the starch is a native starch selected from corn starch, high amylose corn starch, potato starch, sweet potato starch, wheat starch, rice starch, tapioca starch, sorghum starch, and a combination thereof.

35. The protein/starch thermoplastics composition according to claim 26, wherein the starch is a chemically modified starch selected from hydroxyethyl starch, hydroxypropyl starch, carboxymethyl starch, acetylated high amylose starch, starch acetate, starch maleate, starch octenylsuccinate, starch succinate, starch phthalate, hydroxypropylate high amylose starch, cross-linked starch, starch phosphates, hydroxy propyl distarch phosphate, cationic starch, starch propionamide, and a combination thereof.

36. The protein/starch thermoplastic composition according to claim 26, wherein the plasticizer is selected from glycerol, ethylene glycol, 1,3-propanediol, propylene glycol, sorbitol, sorbitan, mannitol, diglycerol, butanediol, urea, glycerol monoacetate, glycerol diacetate, and a mixture thereof.

37. The protein/starch thermoplastic composition according to claim 26, wherein the natural cellulosic fiber is a natural plant fiber.

38. The protein/starch thermoplastic composition according to claim 26, wherein the natural cellulosic fiber is selected from grass fibers, wood fibers, chopped straw, bagasse, cotton fibers, chopped leaves, chopped corn husks, hemp fibers, and mixtures thereof.

39. The protein/starch thermoplastic composition according to claim 26, wherein the blowing agent is water.

40. The protein/starch thermoplastic composition according to claim 26, wherein the blowing agent is an endothermal chemical blowing agent.

41. The protein/starch thermoplastic composition according to claim 26, wherein the blowing agent is an exothermal chemical blowing agent.

42. The protein/starch thermoplastic composition according to claim 26, wherein the blowing agent is a physical blowing agent selected from ethanol, 2-propanol, acetone, butanes, pentanes, hexanes, chlorofluorocarbons, or a combination thereof.

43. The protein/starch thermoplastic composition according to claim 26, wherein the blowing agent is a compressed gas physical blowing agent.

44. The protein/starch thermoplastic composition according to claim 43, wherein the compressed gas is nitrogen or carbon dioxide.

45. The protein/starch thermoplastic composition according to claim 26, wherein the lubricant is selected from castor oil, corn oil, soybean oil, lecithin, fatty acids, monoglycerides, diglycerides, esters of fatty acids and polyhydroxy alcohols, and a combination thereof.

46. The protein/starch thermoplastic composition according to claim 26, wherein the nucleating agent is selected from sodium bicarbonate, citric acid, sodium citrate, talc, silicon dioxide, calcium carbonate, or a combination thereof.

47. The protein/starch thermoplastic composition according to claim 26, further comprising a coloring agent.

48. The protein/starch thermoplastic composition according to claim 26, further comprising a preservative.

49. The protein/starch thermoplastic composition according to claim 26, wherein the composition has a tensile strength of about 0.3 to 12 megapascals measured according to ASTM D3574.

50. The protein/starch thermoplastic composition according to claim 26, wherein the composition has a resilience greater than 80% measured according to ASTM D3574.

51. The protein/starch thermoplastic composition according to claim 26, wherein the metallic salt hydrate is a calcium, sodium, potassium, zinc, iron, aluminum or phosphorus salt or a mixture thereof.

52. The protein/starch thermoplastic composition according to claim 26, wherein the metallic salt hydrate is a chloride, carbonate, sulfate, nitrate, lactate, oxalate, or acetate salt or a mixture thereof.

53. The protein/starch thermoplastic composition according to claim 26, wherein the metallic salt hydrate is $CaCl_2.2H_2O$, $Ca(NO_3)_2.4H_2O$, $CaSO_4.2H_2O$, $AlK(SO_4)_2.12H_2O$, $AlNH_4(SO_2)_2.12H_2O$, $C_6H_{10}Ca.12H_2O$, or a mixture thereof.

54. The protein/starch thermoplastic composition according to claim 26, wherein the composition is formed by extrusion with a foam die.

55. The protein/starch thermoplastic composition according to claim 26, further comprising about 5 to 20 wt. % modifier.

56. The protein/starch thermoplastic composition according to claim 55, wherein the modifier is polyvinyl alcohol, polylactic acid, polycaprolactone, polyester amide or a natural biopolymer.

57. The protein/starch thermoplastic composition according to claim 56, wherein the natural biopolymer is sodium alginate, lignose, or carbohydrate gum.

* * * * *

UNITED STATES PATENT AND TRADEMARK OFFICE
CERTIFICATE OF CORRECTION

PATENT NO. : 5,922,379
DATED : July 13, 1999
INVENTOR(S) : Wang

It is certified that error appears in the above-identified patent and that said Letters Patent is hereby corrected as shown below:

In column 5, line 17, please delete "i n" and insert therefor --in--.

In column 5, line 18, please delete "cellulos ic" and insert therefor --cellulosic--.

In column 5, line 22, please delete "wit hin" and insert therefor --within---.

In column 5, line 22, please delete "th e" and insert therefor --the--.

In column 17, line 67, please delete "linking" and insert therefor --linked--.

In column 21, line 58, please delete "hydrate_" and insert therefor --hydrate,--".

Signed and Sealed this

Twenty-fourth Day of October, 2000

Attest:

Q. TODD DICKINSON

*Attesting Officer*  *Director of Patents and Trademarks*